United States Patent

Roach

[11] 4,013,345
[45] Mar. 22, 1977

[54] DEFORMABLE MIRROR LIGHT VALVE AND METHOD OF OPERATING THE SAME

[75] Inventor: William Ronald Roach, Rocky Hill, N.J.

[73] Assignee: RCA Corporation, New York, N.Y.

[22] Filed: Oct. 22, 1975

[21] Appl. No.: 624,899

[52] U.S. Cl. .......................................... 350/161 S
[51] Int. Cl.² ........................................ G02F 1/34
[58] Field of Search ................................... 350/161

[56] References Cited
UNITED STATES PATENTS

| 3,877,791 | 4/1975 | Roach | 350/161 |
| 3,907,407 | 9/1975 | Vilkomerson et al. | 350/161 |

Primary Examiner—William L. Sikes
Attorney, Agent, or Firm—Glenn H. Bruestle; Carl L. Silverman

[57] ABSTRACT

A deformable mirror light valve includes a plurality of substantially transparent parallel electrodes which are disposed on one surface of a transparent substrate. The electrodes are electrically insulated from each other. A photoconductor layer is on the transparent electrodes and an elastomer layer is on the photoconductor layer. A deformable mirror is on the elastomer layer. The plurality of electrodes permit the biasing voltage for each area on the light valve to be optimally phased with respect to the scanning of that area. Consequently, the use of this device provides for a substantially uniform deformation intensity, i.e., read out intensity, over the entire area of the light valve.

8 Claims, 6 Drawing Figures

DEFORMABLE MIRROR LIGHT VALVE AND METHOD OF OPERATING THE SAME

BACKGROUND OF THE INVENTION

This invention relates to a deformable mirror light valve, and particularly to such a light valve having a plurality of transparent electrodes on one surface of a transparent substrate.

Deformable mirror light valves are well-known devices capable of amplifying the light intensity of an optically projected image, e.g., see U.S. Pat. No. 2,896,507 entitled "Arrangement for Amplifying the Light Intensity of an Optically Projected Image," issued on July 28, 1959. Further information on these devices can be found in U.S. Pat. No. 3,716,359 entitled "Cyclic Recording System by the Use of an Elastomer in an Electric Field," issued Feb. 13, 1973, and in U.S. Pat. No. 3,842,406, also entitled "Cyclic Recording System by the Use of an Electric Field," issued Oct. 15, 1974. Generally, the devices are layered structures including a transparent conductor layer, a photoconductor layer, an elastomer layer, a thin flexible layer of conductive metal, and means for applying a voltage across the transparent conductor layer and the flexible layer of conductive metal.

A light image absorbed by the photoconductor layer generates electron hole pairs. The voltage applied across the transparent conductor layer and the thin flexible metal layer causes the mobile carriers to drift in the photoconductor layer. As the oppositely charged carriers separate, a non-uniform charge pattern is formed, thereby causing the thin flexible metal layer to deform.

Although deformable mirror light valves have been developed and are successful for many applications, e.g., projected image displays, widespread use has heretofore been discouraged. For example, it would be desirable to employ such a light valve in combination with an optical scanner wherein the optical information is written into the valve in a scanning mode. Such an approach could take advantage of recent advances in laser scanning techniques. Of particular significance would be the development of a light valve capable of producing a real time, e.g., television rate (with or without storage), projected image display. However, it has been found that conventional light valves create projected images which suffer from nonuniformity in intensity when operated in a scanning mode. Thus, it would be desirable to develop a deformable mirror light valve which exhibits improved image uniformity when operated in a scanning mode.

SUMMARY OF THE INVENTION

A deformable mirror light valve includes a transparent substrate. A plurality of transparent electrodes are disposed on one surface of the transparent substrate. A photoconductor layer is on the transparent substrate. A photoconductor layer is on the transparent electrodes. An elastomer layer is on the photoconductor layer and a deformable mirror is on the elastomer layer.

DETAILED DESCRIPTION OF THE INVENTION

Figure 1:
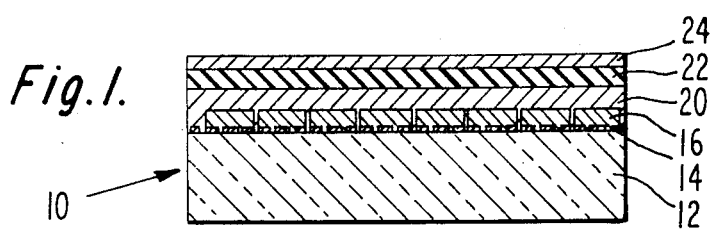
FIG. 1 is a cross-sectional view of one form of a deformable mirror light valve of the present invention.

Referring initially to FIG. 1, one form of a deformable mirror light valve of the present invention is designated generally as 10. The deformable mirror light valve 10 of the present invention includes a transparent substrate 12, such as pyrex, having an optical grating 14 on one surface thereof. The optical grating 14 may consist of parallel lines of chrome which are equally spaced. The optical grating 14 need not extend over the entire surface of the transparent substrate 12; it is sufficient that the grating 14 extend over the target area of the deformable mirror light valve 10, i.e., the area where the optical information is written in. A plurality of substantially identical parallel transparent electrodes 16 are on the grating 14. Each of the electrodes 16 may comprise a transparent electrically conductive material, such as tin doped indium oxide. Typically, each one of the transparent electrodes 16 extends over a plurality of the lines of the grating 14, as shown in FIG. 1. For example, on a light valve having a 1 × 1 inch target area, the grating 14 may include 1,000 lines/inch having 8 transparent electrodes 16 thereon. In such a case, the transparent electrodes 16 have a width of about one-eighth inch with a spacing of about 0.0005 inch between adjacent electrodes 16. A photoconductor layer 20 covers the plurality of transparent electrodes 16. The photoconductor layer 20 may comprise poly (N-vinylcarbazole)doped with trinitrofluorenone. An elastomer layer 22 of an electrical insulator, such as RTV silicone rubber, covers the photoconductor layer 20. The elastomer layer 22 is covered by a thin flexible conductive layer 24, hereinafter referred to as the deformable mirror, which provides good optical isolation between the scanning addressing light and the readout light.

The basic structure of the deformable mirror light valve can be constructed as described in U.S. Pat. No. 3,877,791, entitled, "Deformable Mirror Light Valve and Method of Making Same," which issued Apr. 15, 1975. It is necessary, however, to provide a plurality of transparent electrodes 16. This can be accomplished by conventional deposition and photolithographic techniques. For example, a layer of tin doped indium oxide can be sputtered onto the grating 14 and then selectively removed, i.e., etched away. The photoconductor layer 20, for example, 7 microns of poly(N-vinylcarbazole) doped with trinitrofluorenone, can then be deposited on the transparent electrodes 16. The elastomer layer 22 can be a 6 micron thick layer of a silicone rubber, such as the one commercially available as RTV-602 from General Electric, with 20% of a diluent, such as RTV-910, also commercially available from General Electric.

Figure 2:
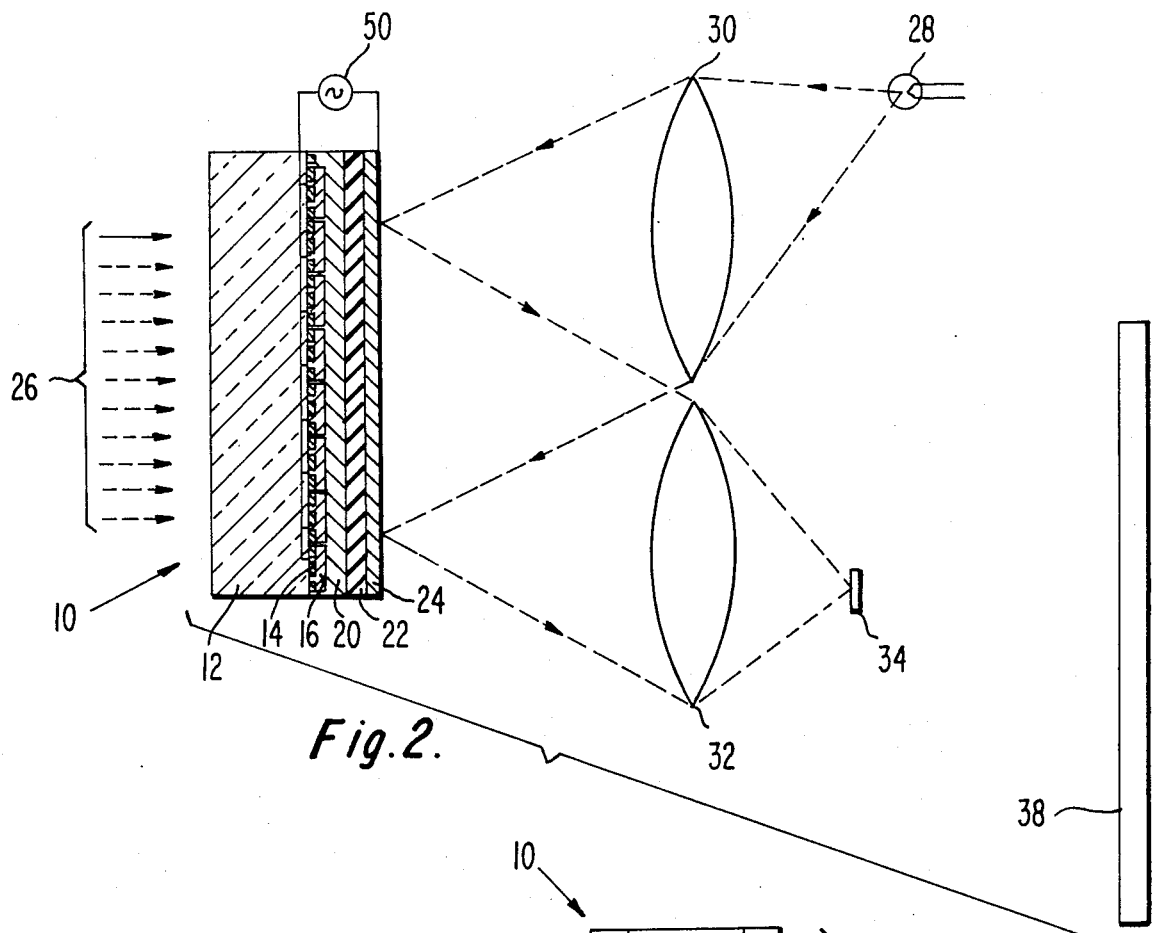
FIG. 2 is one form of a Schlieren optical system suitable for operating the deformable mirror light valve of the present invention.

The operation of the deformable mirror light valve 10 utilizes a Schlieren optical system, known in the art, such as the one shown in FIG. 2. The deformable mirror light valve 10 is positioned wherein modulated scanning addressing light 26 falls incident upon the substrate 12. The modulated scanning addressing light 26 may be provided by a scanning laser beam such as the one described in U.S. Pat. No. 3,882,273, entitled, "Optical Beam Scanning System," which issued on May 6, 1975. The Schlieren optical system includes a high intensity projection lamp 28 which emits light towards a condensing lens 30 which then directs the parallel light toward the deformable mirror light valve 10. The parallel light striking the deformable mirror 24 of the deformable mirror light valve 10 is reflected through a projection lens 32 and focused onto a Schlieren stop 34 as long as the parallel light from the condensing lens 30 strikes the deformable mirror 24 while the deformable mirror 24 is flat.

Figure 3:
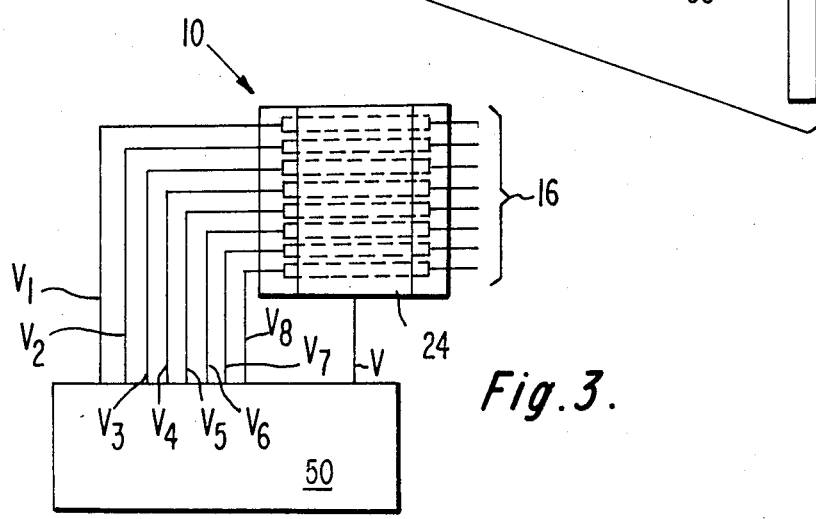
FIG. 3 is a schematic view of one form of a deformable mirror light valve of the present invention in combination with suitable voltage biasing means.

A separate biasing voltage ($V_1$ through $V_8$) is applied to each one of the transparent electrodes 16 while the deformable mirror 24 is provided with a single biasing voltage (V), as shown schematically in FIG. 3. The biasing voltage V is held at ground potential. Each of the biasing voltages may be provided by a biasing network 50. The biasing voltages are preferably ac, especially for real time operation. Particularly desirable is a square wave ac biasing voltage, as shown in FIG. 4.

The addressing light 26 is then scanned across the light valve 10 in a raster pattern so as to scan the areas defined by each of the transparent electrodes 16. Each transparent electrode 16 is completely addressed once during each half-cycle of biasing voltage. For example, the intensity of the scanning addressing light 26 at the $V_1$ electrode as a function of time is shown in FIG. 4.

Figure 4:
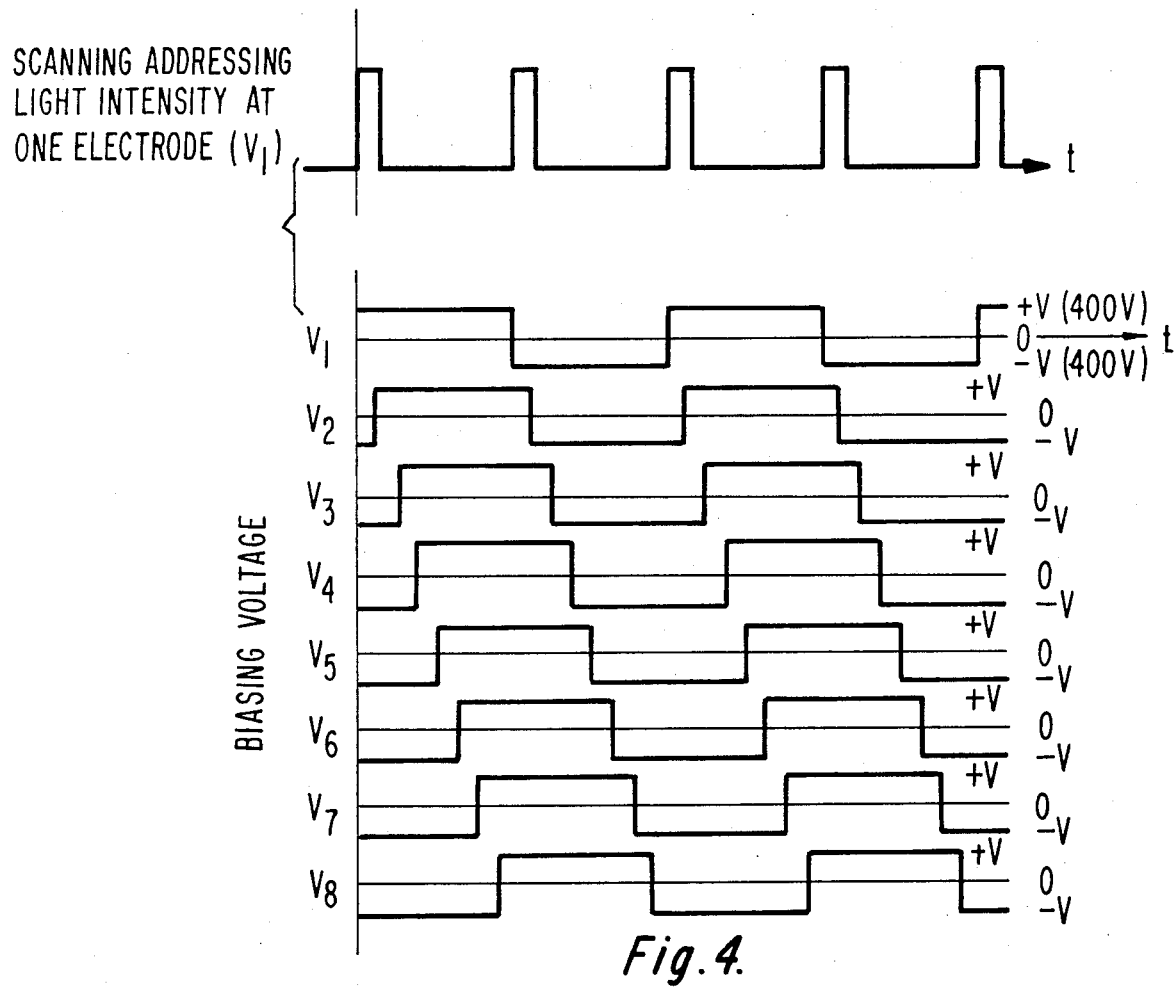
FIG. 4 is a graph showing the relationship between the intensity of the modulated scanning addressing light and the biasing voltage applied to each of the transparent electrodes as a function of time for the deformable mirror light valve of FIG. 3.

Each one of the transparent electrodes 16 is provided with a separate biasing voltage waveform ($V_1$ through $V_8$) which is slightly shifted in phase with respect to the biasing voltage applied to its adjacent electrode 16, as shown in FIG. 4. The phase difference is chosen to be of sufficient time in relation to the position of the scanning addressing light 26 such that the voltage reversal at each electrode 16, i.e., +V to −V or −V to +V, is substantially complete just prior to the scanning of the area which corresponds to the biased electrode 16. That is, allowing for the time delay in appearance of the voltage across the valve, the voltage reversal and the beginning of the scanning addressing light 26 are substantially coincident in the area of the photoconductor layer 20 which corresponds to each one of the transparent electrodes 16. For instance, as shown in FIG. 4, the voltage reversals at the $V_1$ electrode are substantially coincident with the initiation of the scanning addressing light 26. Similarly, although not shown, the voltage reversals at the $V_2$–$V_8$ electrodes are substantially coincident with the respective optical scanning of the $V_2$–$V_8$ electrodes.

Referring again to FIG. 2, at each point where the modulated scanning addressing light 26 strikes the photoconductor layer 20, electron hole pairs are generated. The pairs are separated by the electric field produced by the resultant voltage, which is applied across the light valve 10, thereby causing the deformable mirror 24 of the light valve 10 to deform in accordance with the modulated scanning addressing light 26. Each deformation of the mirror 24 of the deformable mirror light valve 10 causes the light reflected from the deformed mirror 24 to bypass the Schlieren stop 34 and fall upon a viewing screen 38.

In order to operate the light valve 10, it is necessary that the biasing network 50 meet several requirements. The biasing network 50 must be capable of creating eight separate waveforms, preferably square wave ac, e.g., ±400 volts. Each of the separate waveforms must be slightly out of phase with respect to the others, as previously described. In addition, in order to be practicable, the biasing network 50 should include means for synchronizing the waveforms with the scanning addressing light.

Figure 5:
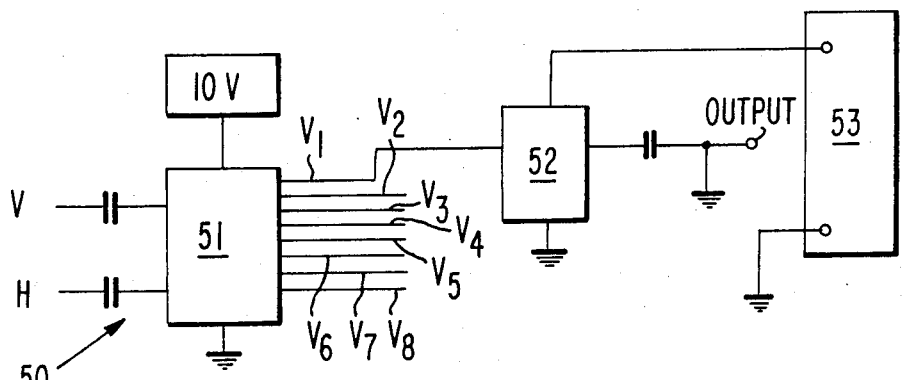
FIG. 5 is a block diagram showing one form of apparatus useful in operating the deformable mirror light valve of the present invention.

There are many biasing networks which can meet these requirements. For example one suitable biasing network 50 is shown in block form in FIG. 5. The network 50 includes a logic circuit 51 which provides eight signals having the desired phase differences. The signal input of the logic circuit 51 includes conventional television vertical and horizontal sync pulses H and V. The logic circuit 51 is powered by a 10 volt DC supply. Each of the outputs ($V_1$ through $V_8$) of the logic circuit 51 is then used to activate a separate high voltage switch 52 (only one shown). Eight high voltage switches 52 are simultaneously connected to a single high voltage power supply 53. The high voltage power supply should be able to provide 1,000 volts DC at 50 milliamps. The AC coupled output of each switch 52 is connected to a separate segment (electrode 16) of the light valve 10. An offset voltage for each switch can be obtained from a single low voltage DC power supply (not shown). This offset voltage is used to equalize the response of the valve for both forward and reverse biasing. The outputs ($V_1$ through $V_8$) of the logic circuit 51 are transformed into AC square waves, such as the ones shown in FIG. 4, through the operation of the high voltage switch 52 and the high power voltage supply 53.

Figure 6:
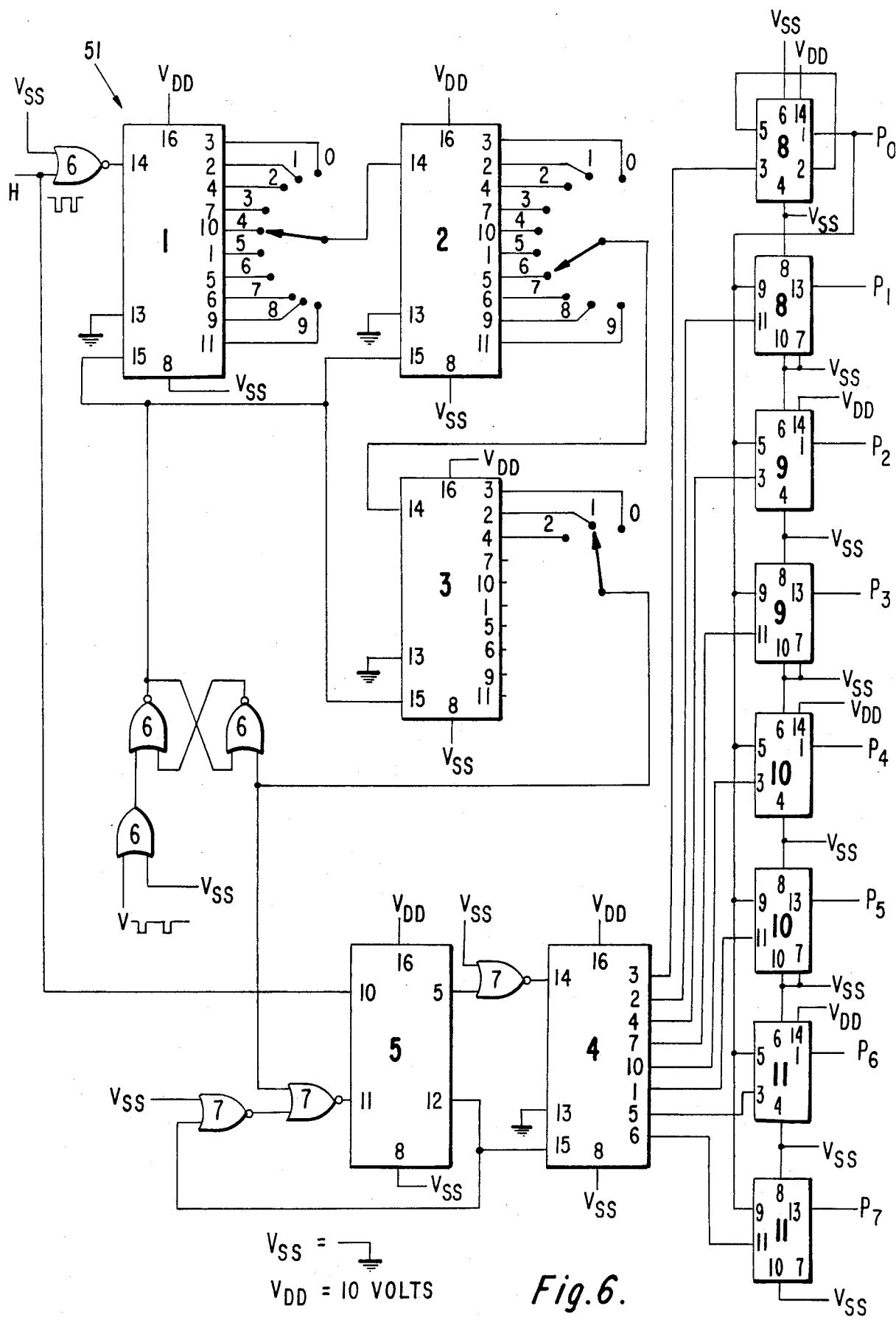
FIG. 6 is a schematic diagram of one form of logic circuit suitable for use in the apparatus of FIG. 5.

The logic circuit 51 is shown more clearly in FIG. 6. Basically, the logic circuit 51 divides each field time into approximately eight equal time portions, i.e., one time portion for each one of the eight transparent electrodes. For instance, the logic circuit 51 shown in FIG. 6 counts each consecutive 32 horizontal sync pulses H and then forms an output signal at the end of each 32 pulse count. Since there are 262.5 pulses in a field time, this results in eight separate output signals which are each separated by a phase difference which represents 32 horizontal sync pulses.

The vertical sync pulses V, which occur each one-sixtieth of a second, are employed in order to properly set the phasing of the entire group of eight signals with respect to the optical scanning. As previously mentioned, it is desirable that the voltage reversal and the scanning addressing light are substantially coincident in the area of the photoconductor layer which corresponds to each one of the transparent electrodes. However, the voltage reversals of the electrodes do not appear instantaneously in the corresponding areas of the photoconductor layer. Thus, it is desirable that the voltage reversal at each electrode be substantially complete just prior to the optical scanning of the corresponding area of the photoconductor layer. This can be accomplished by the logic circuit 51. That is, the vertical sync pulse V is used to set the counters 1, 2, and 3 and a delay of the appropriate number of lines up to 262 is dialed into these counters. The time of the voltage reversal on segment number 1 is thereby established with respect to the sync pulse V and the remaining 7 segments switch at successive 32 line intervals. Hence, if the vertical sync pulses V and horizontal sync pulses H are fed into a laser scanner, the voltage reversals at each electrode will be substantially complete just prior to the optical scanning of the corresponding area of the photoconductor layer, as desired.

The logic circuit 51 shown in FIG. 6 employs 11 different integrated circuits. Integrated circuits 1 through 4 are decade counters/dividers. Integrated circuit 5 is a 14-stage binary/ripple counter. Integrated circuits 6 and 7 are Quad 2-input NOR gates. Integrated circuits 8 through 11 are Dual D flip-flops with set/reset. These integrated circuits are all commercially available from RCA Corp. For example, integrated circuits 1 through 4 are available under the designation CD4017A; integrated circuit 5 is available under the designation CD4020A; integrated circuits 6 and 7 are available under the designation CD4001; and integrated circuits 8 through 11 are available under the designation CD4013.

The use of a plurality of transparent electrodes 16 and the separate biasing thereof, i.e., multiple voltage biasing of the light valve 10, result in a projected image having an improved uniformity of intensity as compared to images obtained by conventional light valves. The improved uniformity is obtained because the modulated scanning addressing light 26 is written into the light valve 10 with a biasing voltage scheme whose action on the valve is more uniform than that of the prior art in which only a single biasing voltage is employed. The use of the single biasing voltage of the prior art results in a situation in which the voltage reversals and the optical scanning are not substantially coincident. Such a situation is undesirable since the result is that deformations located on different scanning lines often exhibit different intensities even though each of the deformations may have been created by identically modulated scanning light.

The image uniformity obtainable in the light valve 10 of the present invention can be increased by further increasing the number of transparent electrodes 16, i.e., decreasing the width of each electrode 16 for a given light valve size, such that each electrode 16 corresponds to fewer scanning lines. Consequently, in such a case, the modulated scanning addressing light 26 will address the area which corresponds to each transparent electrode 16 more rapidly such that the variations in biasing voltage are further reduced. That is, since each electrode 16 encompasses fewer scanning lines, the biasing variations between the lines which correspond to one electrode 16 will be decreased. Similarly, the biasing variations between different electrodes will also be decreased.

Thus, if the degradation in average brightness in a conventional light valve are termed 100% degradation, light values of the present invention reduce these degradations directly in accordance with the number of increased electrodes. I have found that a reasonable number of electrodes, e.g., between 8 and 16, will allow real time operation of the light valve with small variations in the average brightness. That is, for 8 electrodes, the degradations in the average brightness will be on the order of 12%; for 16 electrodes, the degradations will be on the order of 6%.

As previously mentioned, uniformity can be increased by increasing the number of transparent electrodes 16. However, the minimum space between the transparent electrodes 16 must be such that the voltage difference between adjacent electrodes 16 is maintained, even during the worst time of the cycle. For example, in the eight electrode structure shown in FIG. 3, if the biasing is square wave ac, i.e. ± V, the worst case has a voltage of 2V appearing between adjacent electrodes 16, as shown in FIG. 4. Consequently, care must be taken to insure that this voltage difference is maintained, e.g., the electrodes should be sufficiently spaced.

If desired, the voltage difference between adjacent electrodes 16 can be minimized by modifying the square wave, biasing scheme previously disclosed. For example, those portions of the square wave which cause the greatest voltage difference to appear can be eliminated. That is, although not shown, a square wave having stepped portions can be provided. This can be accomplished through the use of conventional voltage dividers. However, this will result in a slight loss of overall optical readout efficiency due to the reduction in biasing.

In order to optimize the ac performance of the deformable mirror light valve of the present invention, it is desirable that substantially all the electron hole pairs formed in the photoconductor layer 20 are forced to remain in the photoconductor layer 20, while no new charge carriers are introduced through the transparent electrodes 16. This can be accomplished by disposing an insulating layer of a material such as silicon dioxide, between the transparent electrodes 16 and the photoconductor layer 20, as described more fully in copending application Ser. No. 475,138, filed May 31, 1974. With the use of such an insulating layer, charge carriers, remaining trapped between the insulating layer and the elastomer layer, which is typically an insulator, will, upon reversal of the voltage, combine with their partners, leaving no undesirable residual charge; hence, no after image. Furthermore, the use of such an insulating layer permits the achievement of projected images which are substantially lag-free.

Although the deformable mirror light valve of the present invention has been described with an optical grating, the optical grating can be replaced by writing the optical information into the light valve in a raster pattern with a scanning beam or merely employing additional optics outside of the deformable mirror light valve. Further, although the elastomer layer has been described as being of silicone rubber, many other elastomer materials can be employed, for example, a liquid or gas elastomer, as described in previously mentioned U.S. Pat. Nos. 3,716,359 and 3,842,406. Also, the use of the deformable mirror light valve of the present invention is not limited to ac biasing. The use of the light valve of the present invention also improves the deformation uniformity for dc operation, although to a lesser degree.

In addition, although the deformable mirror light valve of the present invention has been described in combination with a projected image display, the light valve is useful for other applications. For example, the deformable mirror light valve of the present invention is useful for recording scanned optical information, such as in xerography. Thus, there is provided by the present invention, a deformable mirror light valve which exhibits improved image uniformity when operated in a scanning mode.

I claim:
1. A deformable mirror light valve comprising:

a transparent substrate of electrically insulating material, a plurality of transparent electrodes on one surface of said transparent substrate, a photoconductor layer on said transparent electrodes, an elastomer layer on said photoconductor layer, a deformable mirror on said elastomer layer, and means for applying a separate biasing voltage to each one of said transparent electrodes while said light valve is subjected to scanning addressing light with voltage reversals in the area of said photoconductor layer which corresponds to each one of said transparent electrodes being substantially coincident with said scanning addressing light.

2. A deformable mirror light valve in accordance with claim 1 in which said transparent electrodes have an elongated dimension and are substantially identical.

3. A deformable mirror light valve in accordance with claim 2 in which said transparent electrodes are in substantially parallel relation.

4. A deformable mirror light valve in accordance with claim 3 in which adjacent ones of said transparent electrodes are spaced so as to be electrically insulated from each other.

5. A deformable mirror light valve in accordance with claim 4 which includes between eight and 16 of said transparent electrodes.

6. A deformable mirror light valve in accordance with claim 4 in which a grating partially covers said surface of said transparent substrate, said grating being disposed between said substrate and said transparent electrodes.

7. A method for operating a deformable mirror light valve, comprising the steps of:

providing a deformable mirror light valve which includes a transparent substrate, a plurality of substantially identical transparent electrodes on one surface of said transparent substrate, a photoconductor layer on said transparent electrodes, an elastomer layer on said photoconductor layer, and a deformable mirror on said elastomer layer;

subjecting said light valve to scanning addressing light; and electrically biasing said light valve, said biasing including applying a separate biasing voltage to each one of said transparent electrodes such that the voltage reversal and said scanning addressing light are substantially coincident in the area of said photoconductor layer which corresponds to each one of said transparent electrodes, 8. A method in accordance with claim 7 which includes providing an ac square wave biasing voltage to each one of said transparent electrodes.

* * * * *

UNITED STATES PATENT OFFICE
CERTIFICATE OF CORRECTION

PATENT NO. : 4,013,345
DATED : March 22, 1977
INVENTOR(S) : William Ronald Roach It is certified that error appears in the above-identified patent and that said Letters Patent are hereby corrected as shown below:

Column 1, lines 57-58, delete the sentence, "A photo-conductor layer is on the transparent substrate."

Signed and Sealed this

Twenty-fourth Day of May 1977

[SEAL]

Attest:

RUTH C. MASON
Attesting Officer

C. MARSHALL DANN
Commissioner of Patents and Trademarks